Dec. 2, 1958 H. A. FAIRHURST 2,862,999

ELECTRON BEAM CONTROLLING SYSTEM

Filed Dec. 19, 1955 2 Sheets-Sheet 1

INVENTOR
Harold Alfred Fairhurst
BY Q. E. Odell
ATTORNEY

ELECTRON BEAM CONTROLLING SYSTEM

Filed Dec. 19, 1955 2 Sheets-Sheet 2

INVENTOR
Harold Alfred Fairhurst
BY [signature]
ATTORNEY

United States Patent Office 2,862,999
Patented Dec. 2, 1958

2,862,999

ELECTRON BEAM CONTROLLING SYSTEM

Harold Alfred Fairhurst, Welwyn Garden City, England, assignor to Murphy Radio Limited, London, England, a British corporation Application December 19, 1955, Serial No. 553,782
Claims priority, application Great Britain December 24, 1954
3 Claims. (Cl. 178—5.4)

Figures 1, 3, 5:
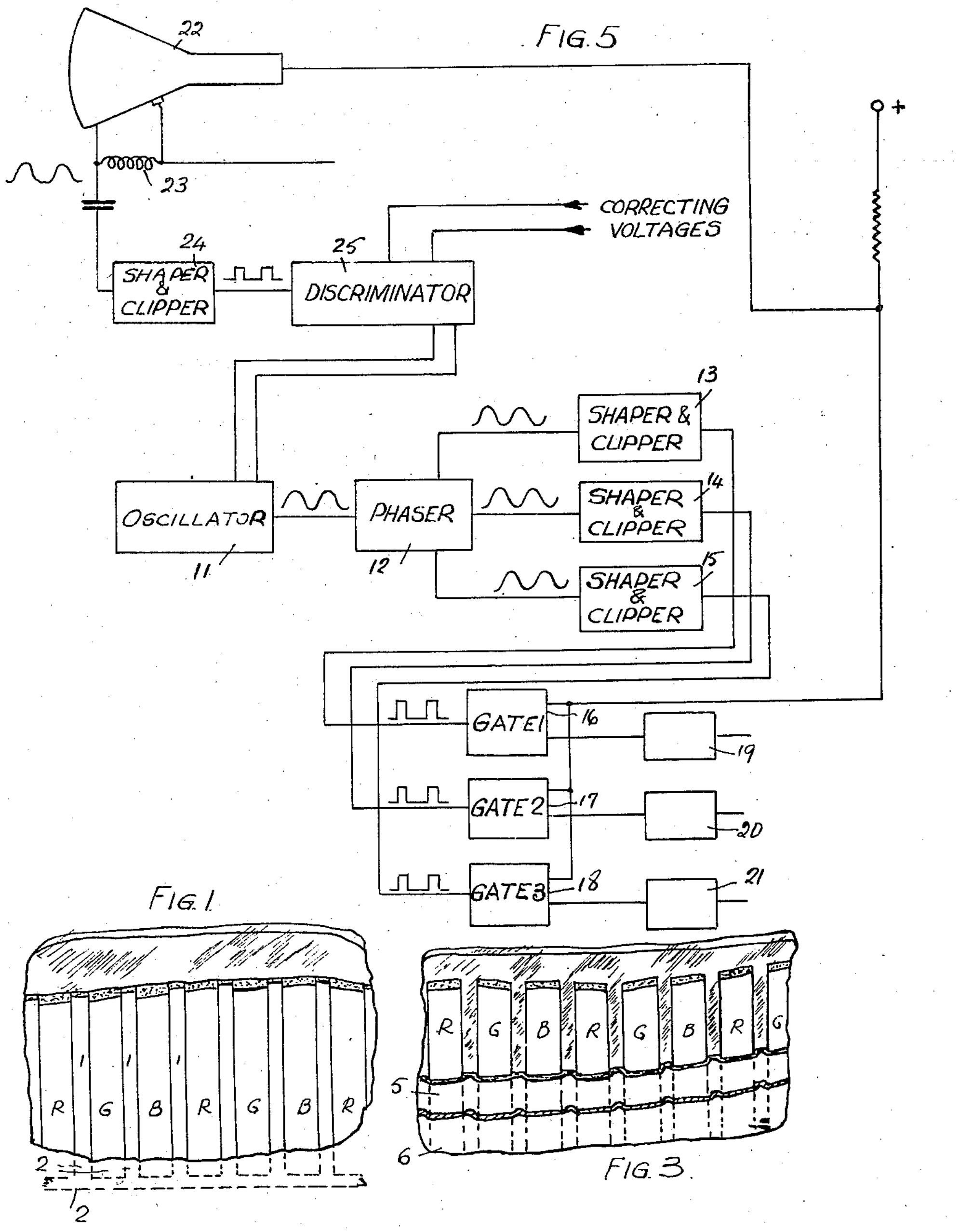
Figure 2:
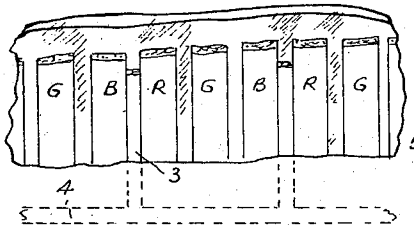

This invention relates to the presentation of coloured television pictures transmitted by radio.

In particular it is concerned with presentation upon a known type of cathode ray tube in which the picture is formed upon a grid of linear phosphors running transversely of the direction of line scan; such tubes are described, for example, in specifications Leverenz 2,310,863, Beers 2,385,563, and Nicoll 2,631,259. The linear phosphors are in groups of three, the phosphors of a group reproducing, respectively, the red, blue and green element of the picture when the cathode ray impinges upon them.

For simplicity it may be assumed that from the radiation received the receiver derives in known manner three voltage wave forms continuous throughout each picture line the ordinates of which are indicative respectively of three primary colours in the scene transmitted. It will become apparent that the invention described below is equally applicable to receivers in which matrixing is performed in the cathode ray tube by applying R—Y, G—Y and B—Y components in turn to the grid of the tube while the brightness signal Y is applied to its cathode.

If the point of impact of the cathode ray upon the screen of the tube travelled at a precisely constant rate across the screen all that would be needed to produce a picture would be a commutator or switching device working at a constant rate which connected the grid of the cathode ray tube to the voltage wave forms indicative of red, blue and green respectively while the point of impact, the spot, was traversing phosphors which reproduce the corresponding colour. But though many attempts have been made to produce a ray deflecting field of sawtooth wave form—examples are to be found in British specifications 511,600, 663,041, 700,453, 700,454, 705,752 and 736,005—it has not so far proved practical to achieve the exactness of linear progression necessary to this end. Moreover, even if the deflecting field had a strictly rectilinear wave form and the rate of angular swing of the cathode ray was constant, the spot would not travel at a uniform speed across the screen because the screen is not a spherical surface with centre at the effective centre of swing of the ray; as a rule it is flattened though not plane, so that if the ray swings at uniform angular speed the spot travels faster at the ends of its path than at the middle. Besides this the length of path from the electron gun to the edges of the picture is longer than the path to the middle of the picture, so that if commutation were exact in the middle of the picture it might not be sufficiently exact at the edges.

The principal purpose of this invention is to obtain exact agreement between the time of switching of the "red voltage" on to the cathode ray tube grid and the time of passage of the spot over a "red" phosphor, and so on.

A further purpose of the invention is to approximate the frequency of commutation as exactly as possible to the rate of travel of the scanning spot over the phosphor grid without requiring a broad frequency response in the control circuits.

With these purposes in view one object of the invention is a colour television receiver wherein commutation is governed by an oscillator of variable frequency, and the oscillator frequency is controlled at least in part by pulses arising from the sweep of the cathode ray over the screen.

A further object of the invention is a colour television receiver wherein commutation is governed by an oscillator the frequency of which is designed to correspond with the mean rate of sweep of the cathode ray over the screen and to be varied in dependence on departures of the scanning field from linear variation.

Yet another object of the invention is a colour television receiver wherein an oscillator governing commutation is varied in frequency in dependence on the variation of the rate of travel over the screen of the point of impact of a ray swinging at uniform rate.

These and other objects of the invention will appear more fully from the following description of a colour television receiver embodying the invention.

The accompanying drawings show

Figures 6, 7:
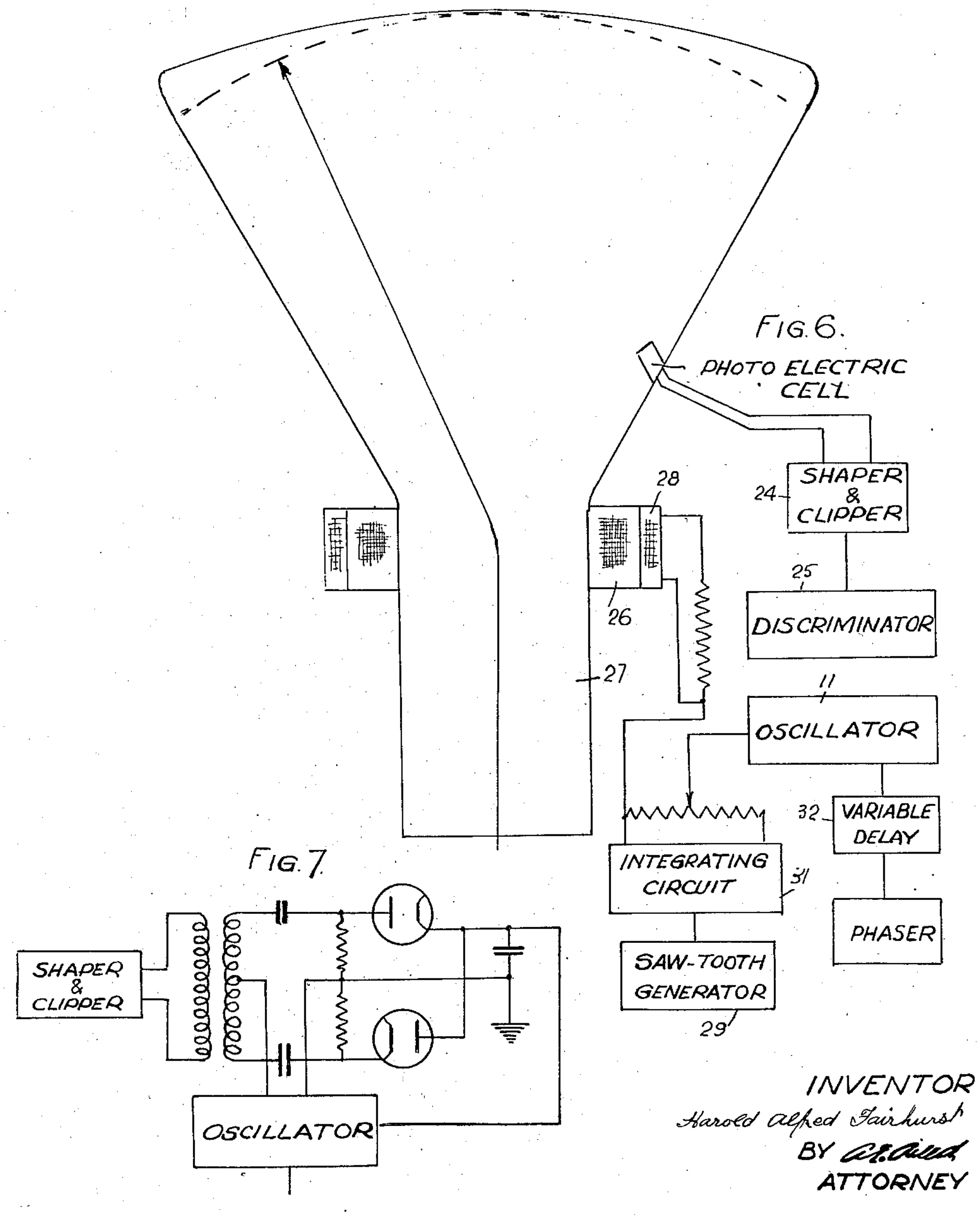

In Figs. 1 to 4 alternative constructions of screen for the cathode ray tube;

In Fig. 5 a block diagram of so much of a television receiver as is affected by the invention;

In Fig. 6 a construction of cathode ray tube for use in the receiver, and

In Fig. 7 a diagram of a phase discriminator.

Methods of deriving pulses from the sweep of a cathode ray over the screen of the cathode ray tube are already well known. Three varieties may be mentioned:

(1) Collecting at intervals the current represented by the cathode ray itself, (2) Collecting secondary electrons, of high velocity or of any velocity, resulting from the impact of the ray upon the screen, (3) Using variations in light from the back of the screen to produce voltage pulses.

For the purpose of reproducing the picture the screen of the cathode ray tube is covered with a fine grid of linear phosphors running substantially at right angles to the direction of scan. The phosphors are of three kinds producing respectively red, green and blue phosphorescence under the impact of the cathode ray; suitable substances for these phosphors are already known, examples are named in the specifications of Bradley 2,689,927 and Leverenz, 2,310,863. It is preferable to space the phosphors apart; for example they may be 0.175 mm. wide, and spaced apart 0.075 mm. so that a group of three occupies a total width of 0.75 mm.

The cathode ray sweeping over these phosphors and varying in intensity in accordance with the colour signals applied to its grid, causes them to emit light and so produce the picture. The same cathode ray, or another subjected to the same scanning field, produces synchronising signals by the aid of which the commutation of colour signals is effected as hereinafter described. Synchronising signals may be derived from the sweep of a cathode ray over the screen in any of the ways above mentioned.

The cathode ray tube includes, as usual, at least one electron gun directed towards the screen, together with deflecting plates or coils by which electric or magnetic fields of sawtooth wave form are produced by the aid of which the cathode ray is made to scan the beam transversely in successive lines from top to bottom of the screen.

The construction of the screen will vary according to the method of synchronising signal generation adopted. Examples of screen construction are diagrammatically illustrated in Figs. 1 to 4, and further details are to be found in, for instance, the specifications of Beers 2,385,563, Zworykin 2,415,059 and Bradley 2,689,927. Each of Figs. 1 to 4 depicts a fragment of a cathode ray tube screen from which the raster of phosphors and other coatings have been partly removed to show the structure.

In Fig. 1 the spaces between the red, green and blue phosphor lines R, G, B are filled by conductive lines 1 of dried aquadag which are continued and joined together clear of the picture area as indicated at 2. There will be a pulse of current in the grid 1, 2 each time the cathode ray sweeps over a conductor 1. It is not, however, necessary to have such frequent commutation synchronising signals; one signal per group of phosphors is adequate. This will be afforded by the construction shown in Fig. 2 where the raster of phosphors R, G, B is supplemented by metal strips 3, one for each group of three phosphors, these being united, clear of the picture area, by a conductor 4.

Alternatively the raster of phosphors may merely be covered in well known manner with an insulating coating 5, say of alkali silicate, upon which is deposited from vapour a reflecting film of aluminum 6; but the aluminum coating over the phosphors should be isolated from the rest of the usual aluminum coating of the tube. For the secondary electron emission from the back of the aluminum varies as between the part covering one phosphor and that covering another; and by suitable preparation of the screen this effect may be enhanced. Thus a current may be collected from the aluminum screen which contains an alternating component corresponding with the rate at which the screen is swept by the cathode ray tube.

Figure 4:
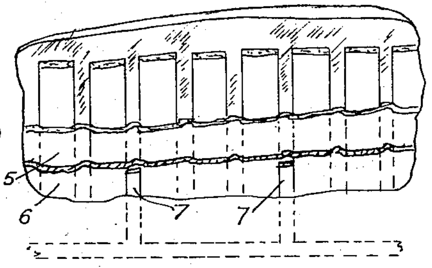

Or, again, as shown in Fig. 4, the reflecting layer of aluminum 5 may have a grid 7 printed upon it. This may consist of lines of dried aquadag connected at their ends, which will have different secondary electron emissivity from the aluminum, or of phosphors emitting light under electron bombardment. Such light must not be allowed to interfere with the picture, and if there is any risk of its penetrating the aluminum screen the phosphors should be such as emit ultra-violet light. The lines of the grid 7 may conveniently be one per group of phosphors; but this is not essential; their number must be sufficient to give the accuracy of synchronising desired.

In order to make use of secondary electron emission the cathode ray tube must be equipped with a collecting electrode, for example as described by Bond in 2,689,926; and to make use of light emitted from the back of the screen the tube should be fitted with a photo-electric cell as indicated diagrammatically at 9 in Fig. 6 or as more fully described by Zworykin in the specification above named.

By any of these means each sweep of the electron beam across the screen or target is caused to produce a large number of synchronising signals, which may be collected from a conductive grid, as 2 or 4, upon the screen, from an electrode to which secondary electron emission is attracted or from a photo-sensitive cell upon which light from the back of the screen falls.

To apply such signals directly to the control of commutating or switching means would necessitate very rapid action and use of control circuits having a broad frequency response. The aim of the invention is to approach as nearly as possible a stable frequency of commutation and a linear scan, that is to say uniform speed of travel of the spot across the screen.

To this end, in the first place, commutation is controlled by an oscillator the frequency of which is governed by commutation synchronising pulses derived from the sweep of the cathode ray over the screen as above explained. This is shown in Fig. 5. An oscillator 11 produces an output of a frequency in cycles per microsecond approximately corresponding to the number of phosphors swept by the cathode ray in a microsecond. A phaser 12 produces from the output of the oscillator three voltage waves displaced in time from each other by one third of the period of the oscillator. These are fed to shaping and clipping circuits 13, 14, 15, which produce from them pulses of square wave form as indicated. The square pulses are applied to gate circuits 16, 17, 18 respectively. To the same gate circuits are applied colour signals produced in colour signal sources 19, 20, 21 from the radiation received by the television receiver. Each gate circuit may be thought of as a pentode normally biassed to cut off upon its suppressor grid and conducting only while a shaped and clipped pulse is applied to its suppressor grid. The output circuit of all three gates is connected to the control electrode of a cathode ray tube 22.

Fig. 5 assumes that commutation synchronising pulses appear across an inductance 23 connecting the aluminum backing of the phosphors with the rest of the aluminum coating of the tube which is joined to a source of extra high tension in the usual fashion. These pulses are reduced to square form, as indicated, by a shaper and clipper 24, and are then applied to a phase discriminator 25 which also receives pulses from the oscillator 11, and applies to the oscillator a phase correcting, or frequency correcting, voltage dependent in magnitude and sign upon the difference of phase, if any, between the commutation synchronising pulses and the pulses from the generator. A usual circuit for the phase discriminator is shown in Fig. 7 which needs no explanation.

The extent of correction which can be applied to the oscillator by pulses derived from the sweep of the cathode ray over the screen is limited. For any correction necessary ought to be completed within a few cycles, and if the integrating circuits through which the correction is applied permit of this, the "pull-in" range cannot be wide. It is therefore important to diminish as much as possible the amount of correction needed from this source.

To this end, in the first place, the sawtooth deflecting field which produces the sweep must be made as nearly linear as possible, for example by such means as are described in the British specifications above mentioned. There will remain some departure from linearity, probably exceeding 1%.

To deal with this a low resistance inductance is linked with the magnetic scanning field; for example it may be connected in series with the scanning coils. This is indicated in Fig. 6 where 26 represents the scanning coils producing a deflecting field in the neck of the cathode ray tube 27, and 28 a low resistance coil in series with coil 26. A scanning field varying linearly with time would produce in coil 28 a constant voltage; any departure from linearity will vary this voltage, setting up an alternating ripple of line frequency. As indicated in Fig. 6 this is applied in proper phase and suitable amplitude in series with the output of the discriminator 25.

Departures from linearity of the scanning field may arise through "ringing" of the scanning coils themselves; the corrector coil 28 will deal with this also.

An exactly uniform rate of swing of the cathode ray will not in general result in uniform speed of travel of the spot across the screen, for the screen is not a spherical surface centered upon the point about which the impinging ray may be regarded as swinging; though not plane the screen is considerably flattened, as compared with such a spherical surface, as plainly appears from Fig. 6 so that the spot travels on a tangent to the spherical surface rather than along the spherical surface. The correction needed, here distinguished as the tangent correction, is greater than can be dealt with by the phase discriminator. It is therefore desirable to correct for the tangent error as nearly as may be independently of the discriminator, leaving only a minor departure from uniform rate of travel to be eliminated by the discriminator 25. The correction needed is an acceleration of the spot travel in the middle of the screen and a slowing up towards the edges. This can be imparted to the cathode ray by a deflecting field of appropriate wave form, and the requisite wave form is approximately an integral of the sawtooth wave form. If this tangent correcting field is electrostatic the coil 28 will not be affected by it; but to use a static field would necessitate the provision of deflecting plates. If the tangent correction is applied to the magnetic field, then it will affect the coil 28; and it will be necessary to inject a further correcting voltage into the oscillator-phaser circuit to eliminate the undesired voltage component now appearing in the coil. Such a voltage may be obtained as indicated in Fig. 6 by integration of the sawtooth voltage. The sawtooth generator is 29 and the integrating circuit 31.

The commutation synchronising pulses from the screen will be absent during flyback, and slight modification of the oscillator frequency could result from this; but the departure will be small and will be fully corrected within ten cycles after the pulses recommence.

The flatness of the cathode ray tube screen has another consequence besides the tangent error above explained and dealt with; the length of electron path from the gun to the edge of the screen is greater than the length of path to the middle of the screen. Thus if correcting voltages derived and applied to the oscillator as above explained are in the proper phase when the ray is scanning the middle of the screen they will be a little out of phase when the ray is scanning the edges of the screen. In tubes in which this transit time error is significant it can be compensated for by the insertion of a variable delay line between the discriminator and the oscillator. This correcting means is indicated in Fig. 6 by 32. The delay line may be built of lumped inductances and capacitances, the former having windings upon them by which their cores may be more or less saturated magnetically; or it may consist of a straight core having a coil wound upon it for insertion in the delay circuit, a sheathing of foil forming with the coil a distributed capacitance and an axial conductor carrying the current for saturation. The saturating current will need to vary during the length of a line scan. In general there will in any case be some delay needed in the oscillator output circuit to bring the gating pulses into co-incidence with the sweep of the cathode ray over some phosphor subsequent to the phosphor or conductor which gave rise to a particular synchronising pulse. The delay circuit may be adjusted for this purpose and also to deal with the mean transit time, and the delay may be varied by saturation of the core to compensate for variations of the transit time from the mean. For this purpose a direct saturating current for the core may have superposed upon it a component varying at line frequency and another varying at frame frequency. Voltages of the requisite wave form may be obtained by integration of the line and frame sawtooth wave forms in the manner already indicated.

If the same cathode ray is employed for building up the coloured picture and for generating commutation synchronising signals, the latter may be unduly weak when the picture is dark. This defect may be avoided by providing a second electron gun for giving synchronising signals; but this complication is not necessary. In a single gun tube the luminance component of the received signal may be used to produce by suitable amplification and phase shift a gain control voltage to be applied to the amplifier of the screen pulses. Alternatively the gating pulse oscillator may supply brightening pulses to the cathode ray tube to bring the ray to a standard intensity while it is traversing the conductive strips or interior phosphors from which commutation synchronising pulses are collected.

I claim:

1. Apparatus adapted to modulate a beam of electrons with one of a plurality of signals depending on the position of the beam, comprising in combination a target differentiated into parallel strips responding differently to the impact of an electron beam, an electron gun for projecting an electron beam upon said target, a sawtooth field generator adapted to cause said beam to scan said target at a nearly constant speed in a direction transverse to the target strips, a controlling electrode governing the intensity of the electron beam, a plurality of sources of signals for determining the intensity of the electron beam, gating circuits all connected to said control electrode and each to a source of signals for admitting signals from any one source at a time to said control electrode, an oscillator controlling said gating circuits to pass signals from each source in turn, means for collecting synchronising signals from the response of said target strips and applying them to govern the frequency of said oscillator, means for generating a voltage proportional to the rate of change of the sawtooth field generated by said sawtooth field generator, and means for applying the alternating component thereof to said oscillator to vary its frequency.

2. Apparatus adapted to modulate a beam of electrons with one of a plurality of signals depending on the position of the beam, comprising in combination a target differentiated into parallel strips responding differently to the impact of an electron beam, an electron gun for projecting an electron beam upon said target, a sawtooth field generator adapted to cause said beam to scan said target at a nearly constant speed in a direction transverse to the target strips, a controlling electrode governing the intensity of the electron beam, a plurality of sources of signals for determining the intensity of the electron beam, gating circuits all connected to said control electrode and each to a source of signals for admitting signals from any one source at a time to said control electrode, an oscillator controlling said gating circuits to pass signals from each source in turn, means for collecting synchronising signals from the response of said target strips and applying them to govern the frequency of said oscillator, means for adding to the field generated by said sawtooth field generator, a field proportional to the integral of the sawtooth wave form, means for generating a voltage proportional to an integral of the sawtooth wave form of the field generated by that field generator and means for applying said integrated voltage to said oscillator to vary the frequency thereof.

3. Apparatus adapted to modulate a beam of electrons with one of a plurality of signals depending on the position of the beam, comprising in combination a target differentiated into parallel strips responding differently to the impact of an electron beam, an electron gun for projecting an electron beam upon said target, a sawtooth field generator adapted to cause said beam to scan said target at a nearly constant speed in a direction transverse to the target strips, a controlling electrode governing the intensity of the electron beam, a plurality of sources of signals for determining the intensity of the electron beam, gating circuits all connected to said control electrode and each to a source of signals for admitting signals from any one source at a time to said control electrode, an oscillator controlling said gating circuits to pass signals from each source in turn, means for collecting synchronising signals from the response of said target strips and applying them to govern the frequency of said oscillator, a variable delay line interposed between said oscillator, and said gating circuits controlled thereby, and means for varying the delay of said delay line in the course of each scan of said electron beam.

References Cited in the file of this patent

UNITED STATES PATENTS

| | | |
|---|---|---|
| 2,715,155 | Bryan | Aug. 9, 1955 |
| 2,723,306 | Creamer | Nov. 8, 1955 |
| 2,752,420 | Ehrich | June 26, 1956 |